United States Patent [19]

Kawamura et al.

[11] 4,229,750
[45] Oct. 21, 1980

[54] INFORMATION OUTPUT UNIT

[75] Inventors: Naoto Kawamura, Inagi; Kiyoshi Iizuka, Kawasaki; Nobuyoshi Tanaka, Yokohama; Tetsuro Kuwayama, Yokohama; Kazuya Matsumoto, Yokohama; Takeshi Goshima, Tokyo, all of Japan

[73] Assignee: Canon Kabushiki Kaisha, Tokyo, Japan

[21] Appl. No.: 927,923

[22] Filed: Jul. 25, 1978

[30] Foreign Application Priority Data

Aug. 4, 1977 [JP] Japan .................................. 52/93800

[51] Int. Cl.$^3$ ............................................. G01D 9/42
[52] U.S. Cl. ................................. 346/107 R; 354/12
[58] Field of Search ....................... 346/107 R; 354/12

[56] References Cited

U.S. PATENT DOCUMENTS

| | | | |
|---|---|---|---|
| 3,344,722 | 10/1967 | Cunningwell | 346/107 R |
| 3,827,063 | 7/1974 | Sinnott et al. | 354/12 |
| 3,850,517 | 11/1974 | Stephany et al. | 354/12 |
| 3,952,311 | 4/1976 | Lapeyre | 346/107 R |
| 4,000,495 | 12/1976 | Pirtle | 346/107 R |
| 4,090,206 | 5/1978 | Pfeifer et al. | 346/107 R |
| 4,096,486 | 6/1978 | Pfeifer et al. | 346/107 R |
| 4,107,687 | 8/1978 | Pfeifer et al. | 346/107 R |

Primary Examiner—Monroe H. Hayes
Attorney, Agent, or Firm—Fitzpatrick, Cella, Harper & Scinto

[57] ABSTRACT

An improved output unit used in recording information on a recording medium is disclosed which comprises a plurality of output parts and in which recording of information is carried out while changing the relative position between the output from the output parts and the recording medium. The improved output unit according to the invention is characterized in that the output parts are arranged in rows in a predetermined direction and are disposed in such a manner that information may be put out selectively from the output parts so as to prevent information from being recorded in overlapping fashion on the recording medium in a manner as often occurs in the conventional unit. Spacing between the output parts is selected large enough that the output parts are easy to manufacture. Since a plurality of output parts can be operated very effectively, extremely high recording efficiency is achieved using the information output unit according to the invention. Also, it is possible to use a recording medium having a relatively low sensitivity and which is generally cheap in cost, for carrying out a high speed recording.

20 Claims, 38 Drawing Figures 1a 2a 3a 4a 5a 1b 2b 3b 0 1 0 0 1 1 0

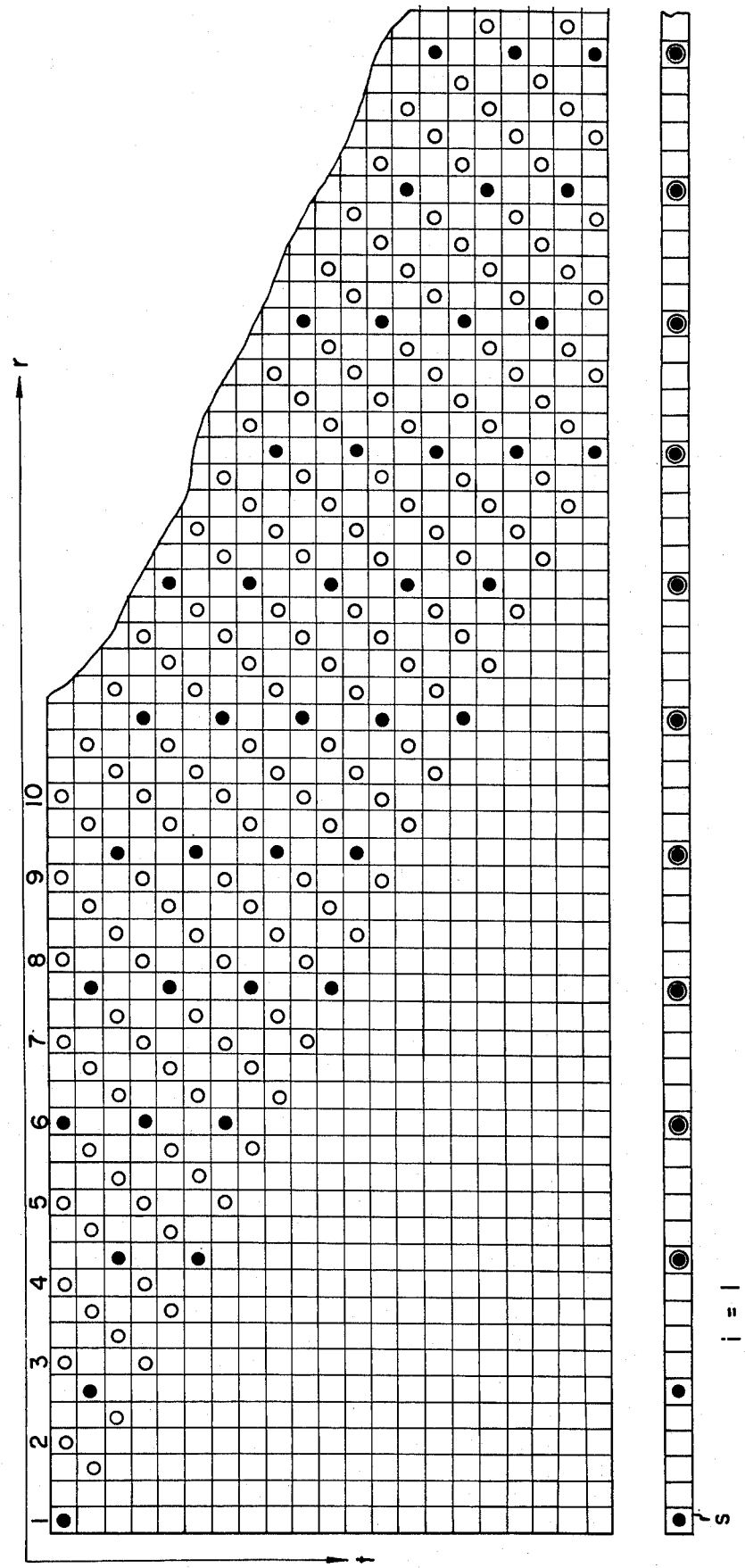

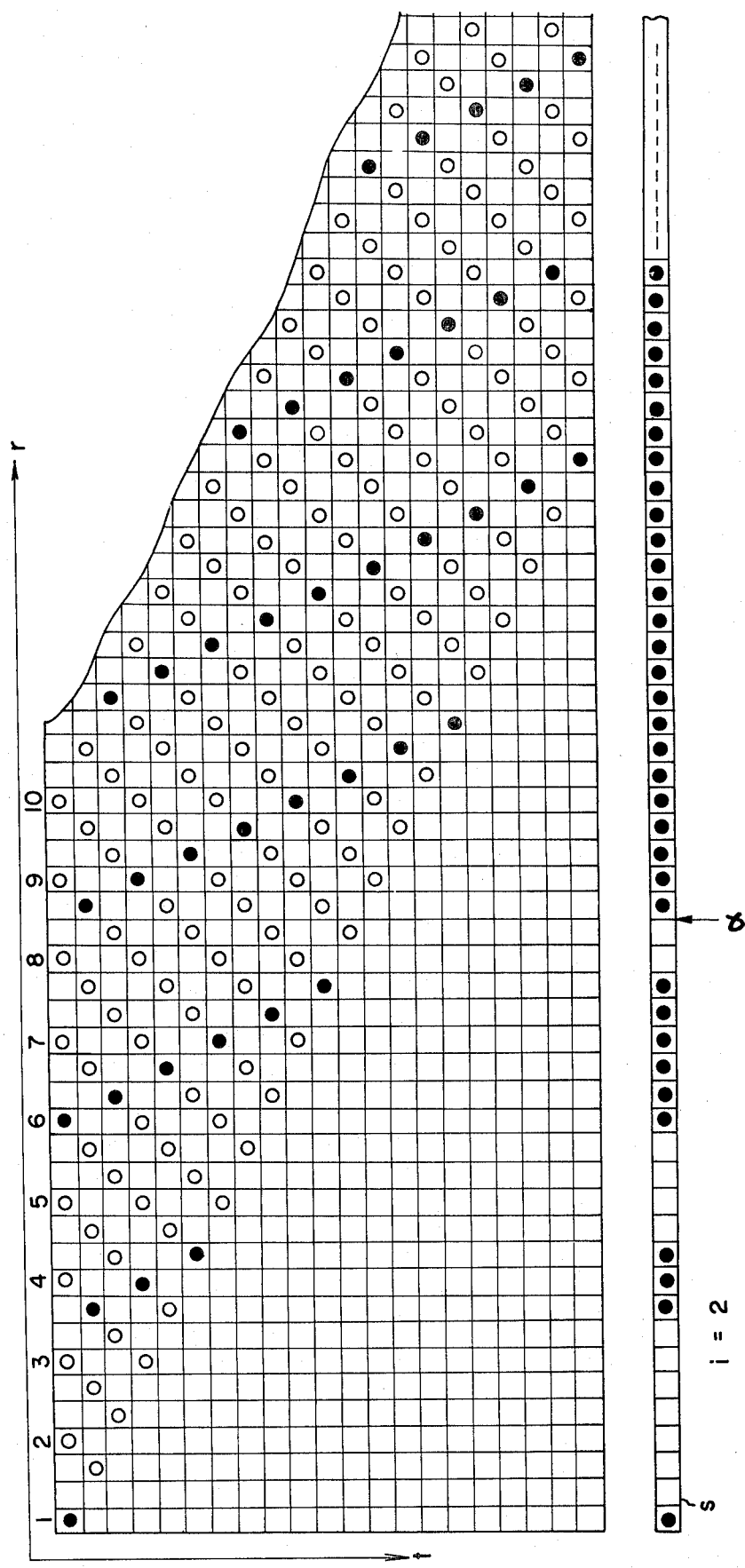

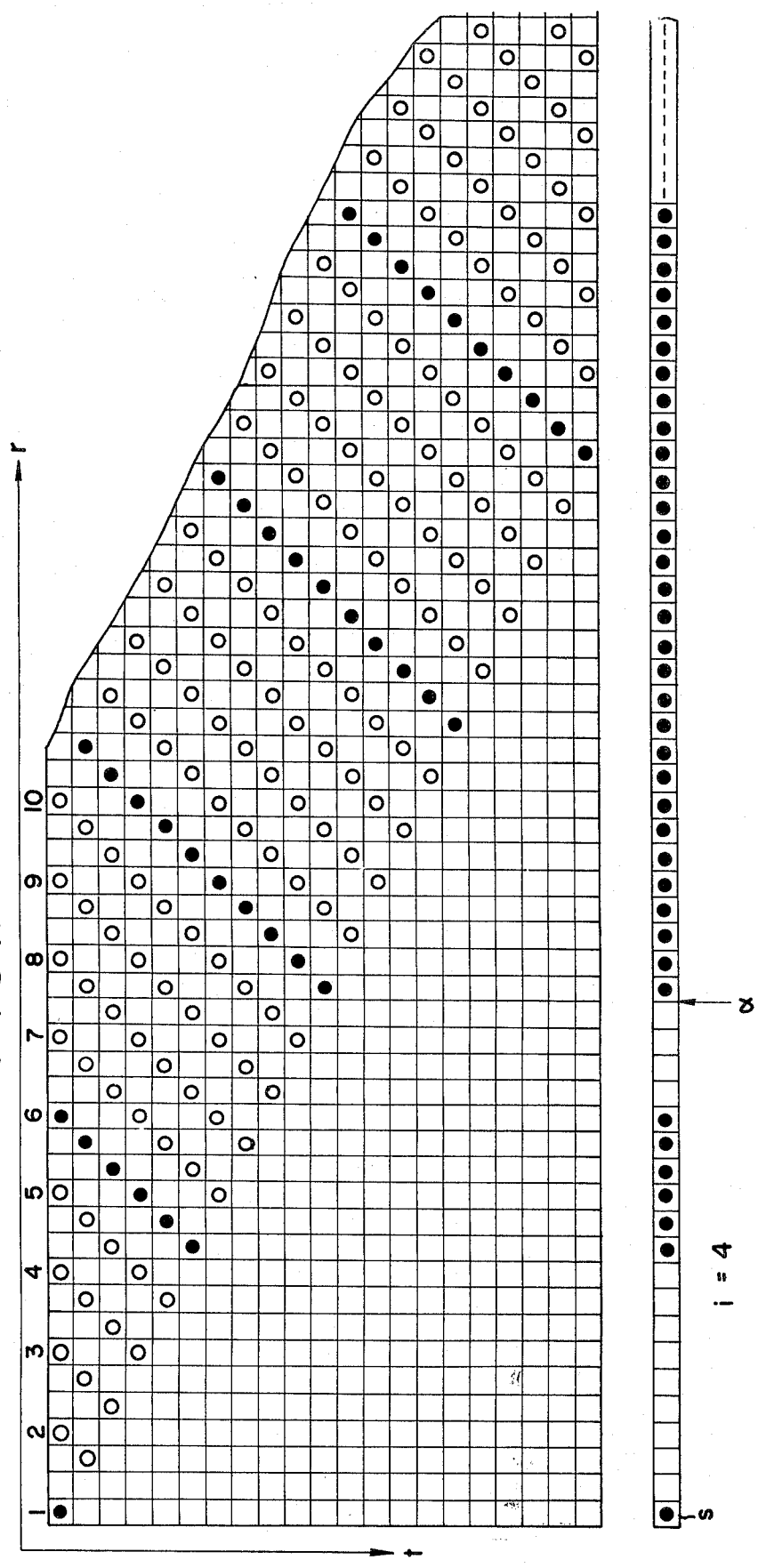

INFORMATION OUTPUT UNIT

BACKGROUND OF THE INVENTION

1. Field of the Invention

The present invention relates to an information output unit used in a recording apparatus of the type in which recording is carried out while shifting the position of output from a plurality of output parts relative to a recording medium on which information is to be recorded by the output parts. More particularly, the present invention relates to improvements is such an information output unit in order to prevent information from being recorded in overlapping fashion on the recording medium.

2. Description of the Prior Art

In driving output parts of information such as semiconductor laser, LED and thermal head with pulsed outputs, it is generally difficult to obtain a high repetitive frequency. This is because when peak power of the pulsed output is increased while keeping the pulse width constant, thermal energy accumulated therein is also increased unduly. This inconvenience is shown in FIG. 1.

In FIG. 1, $T_1$ is the pulse width, $P_0$ is the optical output and $T_0$ is pulse period. If one wishes to increase the optical output maintaining the pulse width constant without increasing the thermal energy accumulated in the unit, there is required a longer pulse period. This means that the duty ($T_1/T_0$) becomes necessarily smaller and the repetitive frequency becomes lower accordingly. The same is also applicable to the case that a longer pulse width is selected as $T_1$. This will also result in a smaller duty and a lower repetitive frequency.

This inconvenience is caused primarily from the fact that the higher the peak power is or the longer the pulse width is, the larger thermal energy is accumulated in the unit and therefore a longer cooling time is required so as to prevent the elements from being damaged by heat. When the recording medium to be used is of relatively low sensitivity, a picture image must be recorded thereon using a relatively high peak power and long pulse width, which in turn reduces the repetitive frequency. As a result, a long recording time is required to make a picture of one sheet. For facsimile apparatus and the like it is generally said that the running cost is determined by the price of the recording medium and the time required for tranmitting and receiving information. Theefore, it has been desired to provide such recording apparatus which enables the carrying out the recording using a recording medium of relatively low sensitivity (cheap recording medium) without the necessity of long recording time (high speed recording).

SUMMARY OF THE INVENTION

Accordingly, it is an object of the present invention to speed up the recording in the aforementioned type of recording apparatus by using a plural number of output parts.

It is another object of the invention to prevent the information from being recorded in overlapped fashion on the recording medium by the output parts.

It is a further object of the invention to arrange the plural number of output parts with sufficient spacing between individual output parts to make it easy to manufacture the output parts.

Still a further object of the invention is to reduce the cost involved in recording by using low sensitivity and therefore cheap recording paper while retaining the merits of high speed recording.

Other and further objects, features and advantages of the invention will appear more fully from the following description taken in connection with the accompanying drawings.

BRIEF DESCRIPTION OF THE DRAWINGS

FIGS. 6C through 6G show information of picture elements appearing at the shift register of the circuit;

FIGS. 13A through 13D show a fifth example of a lighting sequence of light sources;

DESCRIPTION OF THE PREFERRED EMBODIMENTS

Figure 1:
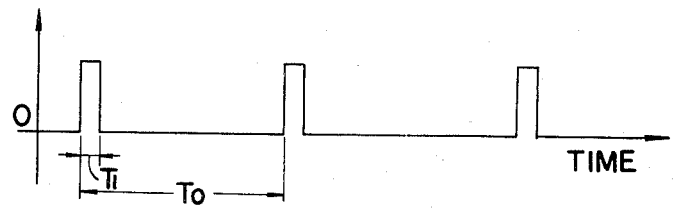
FIG. 1 shows a wave form of pulse for driving information recording means.
Figure 2A:
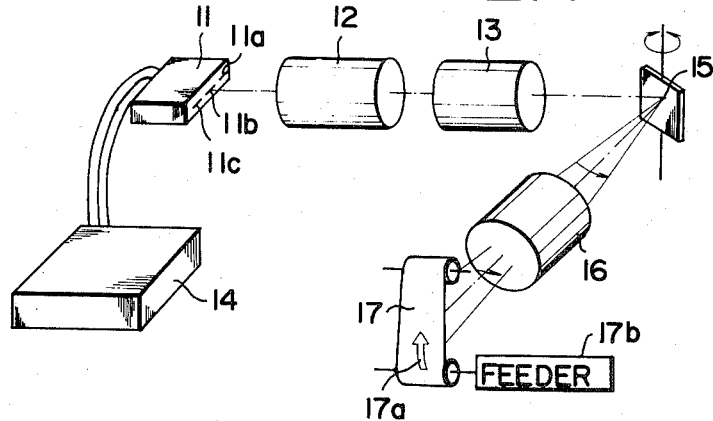
FIG. 2A is a perspective view of a first embodiment of the invention.
Figure 2B:
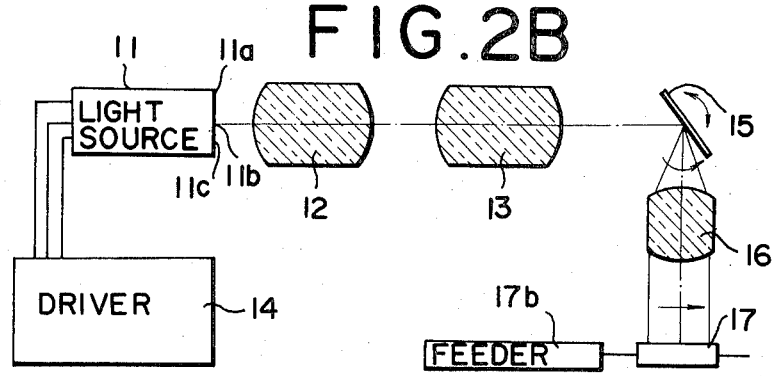
FIG. 2B is a top view thereof.

An embodiment of information output unit according to the invention is shown in FIGS. 2A and 2B in perspective view and in top view respectively.

Figure 3A:
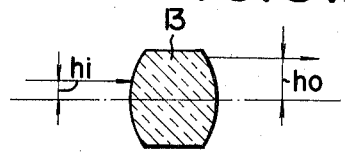
FIGS. 3A and 3B illustrate the path of beam in an afocal converter.
Figure 3B:
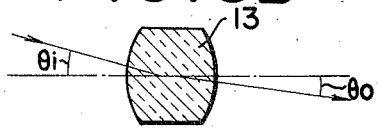

Designated by 11 is a light source comprising a plurality of semiconductor laser groups 11a, 11b, 11c, . . . which are driven independently of each other and united together to form a single chip element. Information from the output means of a driving system 14 is put into these semiconductor lasers in the order of 11a, 11b, 11c, . . . so that they are lighted up successively. Light emitted from each of the semiconductor lasers 11a, 11b, 11c, . . . is collimated through a collimator lens 12. When they emerge from the collimator lens 12, the lights from the different semiconductor lasers have different exit angles with respect to each other. Beam diameter and angle magnification of light emitted from the collimator lens are converted by an afocal converter 13 into those which are most suitable for the system then used. FIGS. 3A and 3B illustrate the beam entering and emerging from the afocal converter 13. Generally, incident beam diameter hi, exit beam diameter $h_o$, incident angle $\theta i$ and exit angle $\theta_o$ have the following relation:

$$\frac{\tan \theta_o}{\tan \theta i} = \frac{hi}{h_o} = r$$

This value of r is called "angle magnification".

For very small values of $\theta_o$ and $\theta i$ or for a system particularly designed for this purpose, the following approximation holds:

$$\frac{\theta_o}{\theta i} \approx \frac{hi}{h_o} = r$$

By suitably selecting the value of r in view of the system used, there can be obtained a scanning system as hereinafter described.

Returning again to FIG. 2B, the light which emerges from the afocal converter 13 is deflected by a deflector 15 (shifting means) which may be, for example, a galvano mirror or a polygon mirror, and is then imaged on a recording surface 17 through an imaging lens 16. Here, the light source 11a, 11b, 11c and the associated beam of light travelling up to the recording surface 17 constitute an information recording means. The imaging lens 16 is of the type known as an f-$\theta$ lens wherein the incident angle and the imaging position are in a linear relation. The unidimensional deflection of the beam by means of the deflector 15 and the unidirectional (in the direction of arrow 17a in FIG. 2A) feeding of the recording surface 17 by means of feeding means 17b enable the recording of a picture image two-dimensionally. To carry out the two-dimensional recording, the recording surface 17 may be advanced stepwise in the direction of arrow 17a after every linear area of a picture corresponding to one scanning line has been recorded on the surface 17 in the direction perpendicular to the arrow 17a, that is, in the direction across the surface 17 as a result of deflection by the deflector 15. Alternatively, the recording surface 17 may be formed as a cylindrical surface as that of a recording drum 26 shown in FIG. 15. To carry out two-dimensional a recording with such recording drum which is rotated by feeding means 17b, deflection by the deflector 15 is effected in such a manner that for every one revolution of feeding means 17b there may take place a deflection by l elements corresponding to the amount of shift which occurs for every clock pulse as will be described in detail later.

Let $f_1$ denote the focal length of the collimator lens 12 and d the center distance between every two light surfaces of m semi-conductor lasers. Then, since usually d<$f_1$, one beam of light emerging from the collimator lens 12 and the next beam of light are different in exit angle from each other by the amount of $$\Delta\theta_1 \approx \frac{d}{f_1} \text{ (radian)}$$

For the beam of light after passing through the afocal converter 13 the angle manification of which is r, the following equation is given:

$$\Delta\theta_2 = r\Delta\theta_1 = r \cdot \frac{d}{f_1} \text{ (radian)}$$

Assuming that the deflector 15 such as a galvano mirror be still in its position, every spot formed by images of the neighbouring semiconductor laser light sources through the imaging lens 16 will be spaced from one another owing to the f-$\theta$ characteristics of the imaging lens, by the amount of:

$$\Delta d = f_2 \Delta\theta_2 = r \cdot \frac{f_2}{f_1} d$$

wherein $f_2$ is the focal length of the imaging lens.

Let $\omega$ denote the angular velocity of deflection of the beam of light by the deflection system. Then each spot will be moved by the following distance during time $\Delta T$:

$$\Delta S = f_2 \omega \Delta T$$

Here, assuming that there is a clock pulse one cycle of which is $\Delta T$, it is defined that $\Delta S$ stands for the size of one picture element when the distance moved by every spot for time $\Delta T$ is $\Delta S$.

In addition, it is assumed that the distance $\Delta d$ between spots on the recording surface be a whole number (=N, N is a whole number) times larger than $\Delta S$, namely it is assumed $$\Delta d = N \cdot \Delta S.$$

This assumption may be realized by suitably setting the clock pulse interval $\Delta T$ or the angle magnification r of the afocal converter 13.

In this manner, when information of one line of a picture is introduced in the unit in time series there is obtained a regularity with respect to the distribution of signals to m semiconductor laser light sources, the sequence of lighting of light sources, the time intervals of illumination etc. Therefore, as a whole, the speed of recording may be increased m times by distributing the picture information among m number of light sources and/or making full use of vacant time provided that each light source should be operated with the same duty as that for the conventional case.

Now, the general rule of regularity of lighting according to the invention and the usability of the invention will be described in detail showing simple concrete examples thereof.

For the purpose of explanation, the following definitions are given: The number of semiconductor laser light sources is m, the spacing between two neighbouring spots is $\Delta d$, the size of pel (picture element) ⓒ is $\Delta S$, the ratio of the spot spacing to the size of pel is N element(s)

$$( = \frac{\Delta d}{\Delta S} ),$$

the amount of shift for every one clock pulse (of which explanation will be made later) is l element(s) and the number of light sources to be lighted at the same time is $\theta$.

Under the above given definitions, there may be considered the following cases:
(I) m=5, N=1, l=1 and $\theta$=1:

This is the case wherein the pitch of spot spacing on a recording or displaying surface using five semiconductor lasers is equal to the size of one pel ΔS.

Figure 4A:
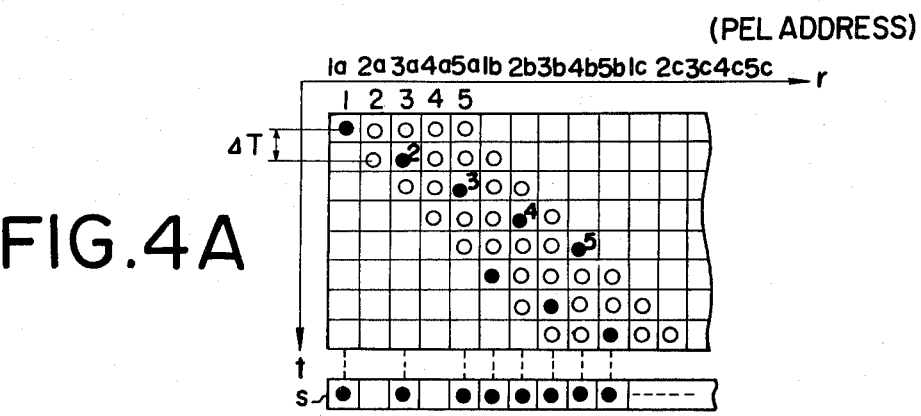
FIGS. 4A through 4C show a first example of a sequence of light sources to be lighted up.
Figure 4B:
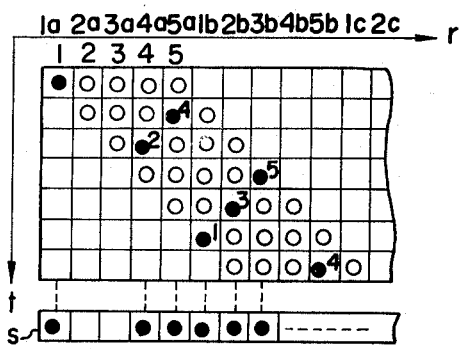
Figure 4C:
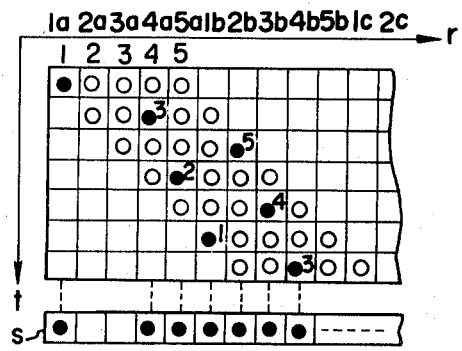

These five light sources (more correctly images thereof) are shifted rightward stepwise by one pel for every clock pulse and at the same time they light up one by one in a sequence as shown in FIGS. 4A–4C in which coordinate of space(r) is taken on the abscissa and coordinate of time(t) on the ordinate and in which a black dot stands for semiconductor laser which is energized at that time. For the purpose of explanation, these five semiconductor lasers are numbered as 1, 2, 3, 4 and 5 from left to right on the drawing.

It will be understood that all the picture elements can be recorded or displayed without any dropping and without any over-lapping of elements only when the five semiconductor lasers, 1, 2, 3, 4 and 5 are energized to light up in the following sequence (lighting sequence):

(a) 1-2-3-4-5, (b) 1-4-2-5-3 or (c) 1-3-5-2-4.

Cases wherein all the picture elements can be recorded without any dropping and without any overlapping are limited only to the above three cases.

On FIGS. 4A, 4B and 4C (also on FIGS. 7, 9, 11 and 13), S is an enlarged scanning line. Black dots standing for light sources in the state of ON are also shown on the scanning line S in the corresponding portions for assisting in understanding of the lighting sequence.

Figure 5:
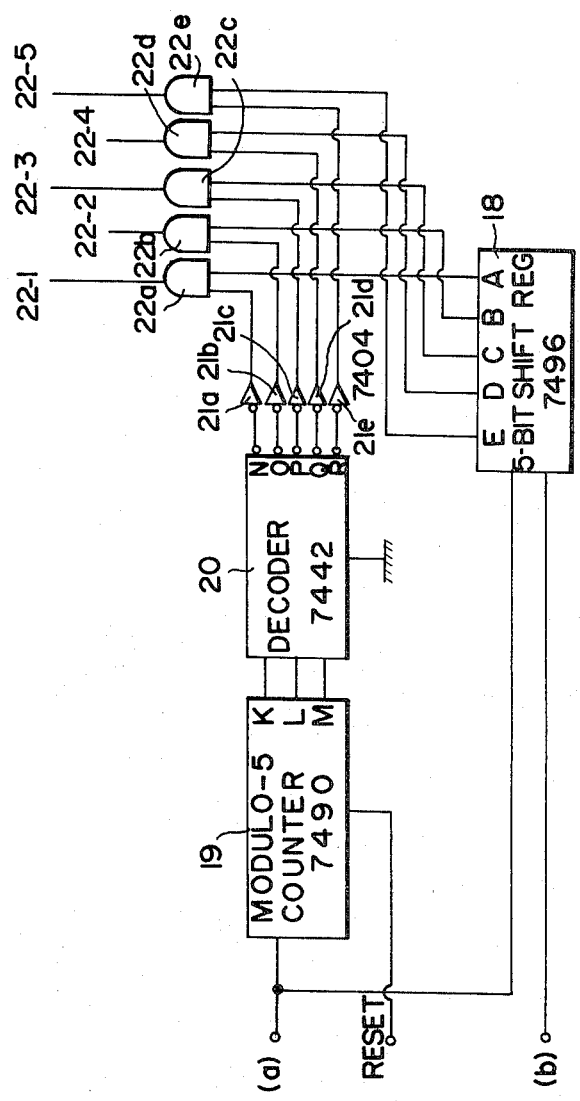
FIG. 5 is a circuit diagram for realizing the lighting sequence shown in FIGS. 4A through 4C.

An example of an electric circuit adapted for realizing the above described sequence of lighting of light sources is shown in FIG. 5. One line of information to be recorded or displayed is put into the circuit in time series and the circuit distributes the information to the semiconductor laser elements and determines the sequence of lighting thereof.

The electric circuit shown in FIG. 5 is designed for realizing the lighting sequence illustrated in FIG. 4A, that is, the case wherein five semiconductor laser elements are energized to light up in the order of 1-2-3-4-5.

Figure 6A:
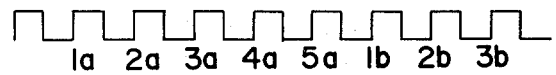
FIG. 6A shows the wave form of clock pulse in the circuit of FIG. 5.
Figure 6B:
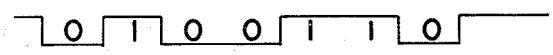
FIG. 6B shows the wave form of input of serial data.
Figure 6H:
FIGS. 6H through 6J show wave forms of output from the modulo-5 counter of the circuit.
Figure 6I:
Figure 6J:
Figure 6K:
FIGS. 6K through 6O show wave forms of output from the inverter of the circuit.
Figure 6L:
Figure 6M:
Figure 6N:
Figure 6O:

The circuit receives information of serial picture elements in an amount of one line of the picture at its input (b). The information received by the circuit corresponds to that designated by 0 or 1 in FIG. 6B. This information is delivered to 5-bit shift register 18 in time series and in synchronism with a clock pulse (FIG. 6A) introduced into the circuit from the input (a). Each information corresponding to each picture element is shifted successively with every clock pulse and is processed as a serial data in the order of 1a, 2a, 3a, 4a, 5a, 1b, 2b, 3b, 4b, 5b, 1c- - - in time series. Outputs A,B,C,D and E of the 5-bit shift register 13 put out data of picture elements as shown in FIGS. 6C, 6D, 6E, 6F and 6G respectively. In a similar manner, from output K, L and M of modulo-5 counter 19 there are put out the outputs of wave forms of FIGS. 6H, 6I and 6J respectively. Furthermore, signals of outputs N, O, P, Q and R of BCD decimal decoder 20 are introduced into inverters 21a–21e which then put out the wave forms of FIGS. 6K, 6L, 6M, 6N and 6O respectively. Outputs A, B, C, D, E from the 5-bit shift register 18 and outputs from inverters 21a–21e are combined together respectively and their logical products are obtained at AND-gates 22a–22e.

Thus, in accordance of the lighting sequence of 1-2-3-4-5, information of each picture element can be put out continuously into the output line group 22-1 through 22-5 in the sequence of 1a-3a-5a-2b-4b- - - (which are driving signals of the output part formed by rearranging the original time series sequence.).

In the same manner and by changing the wiring sequence of the 5-bit shift register 18, the lighting sequence of FIG. 4B and that of FIG. 4C can be easily realized (for 4B there is formed 1a-5a-4a-3b-2b - - - and for 4C formed 1a-4a-2b-5a-3b - - - in the same manner as described for 4A).

(II) m=5, N=2, l=1, θ=1;

The following is the case wherein the pitch of spot spacing on a recording or displaying surface is two times larger than the size of pel ΔS. In this case, as seen from FIGS. 7A–7C, possible lighting sequences in which all of the picture elements can be covered without any overlapping are limited to only three cases given below:

(a) 1-2-3-4-5,
(b) 1-4-2-5-3 and
(c) 1-5-4-3-2.

Figure 7A:
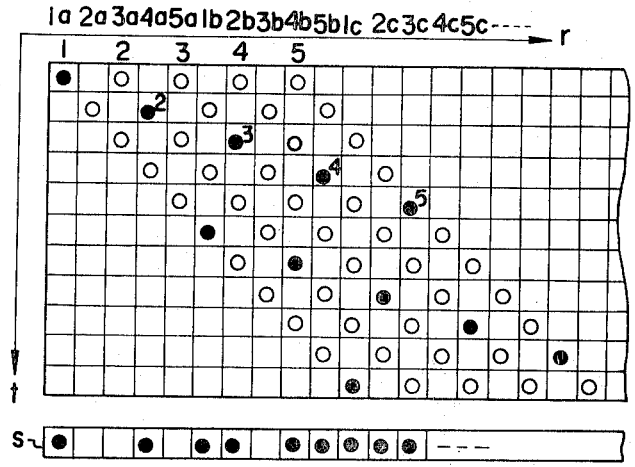
FIGS. 7A through 7C show a second example of a lighting sequence of light sources.

By way of example, the lighting sequence of FIG. 7A is considered. In order to energize the five semiconductor lasers in the sequence of 1-2-3-4-5, it is necessary to put information out as time series pel signals in the sequence of 1a-4a-2b-5b-3c - - - (similarly, for 7B 1a-3b-5a-2c-4b- - - and for 7C 1a-5b-4b-3b-2b- - -).

Figure 8:
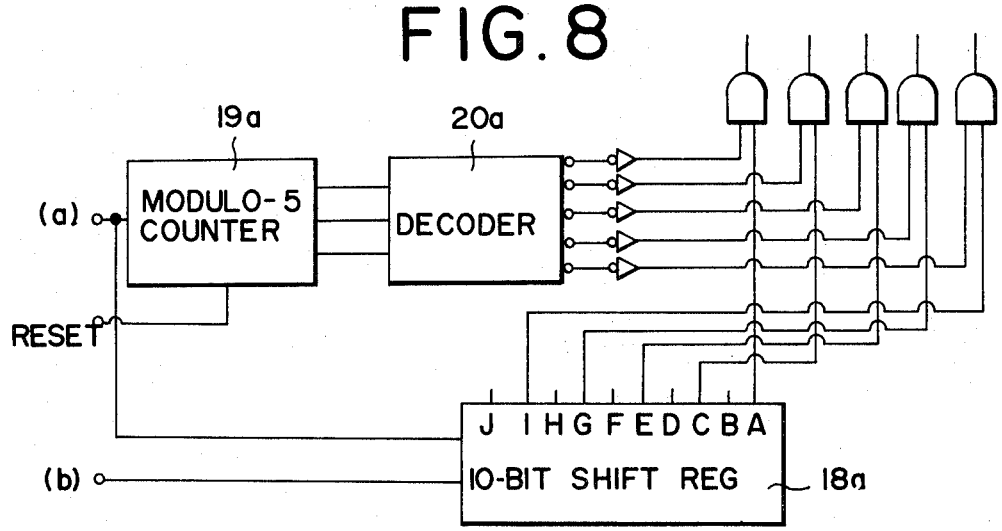
FIG. 8 is a circuit diagram for realizing the second example of lighting sequence.

FIG. 8 shows an electric circuit used for realizing this lighting sequence. The circuit shown in FIG. 8 is essentially the same as that shown in FIG. 5 except that 5-bit shift register 18 is replaced by a 10-bit shift register 18a.

Figure 7B:
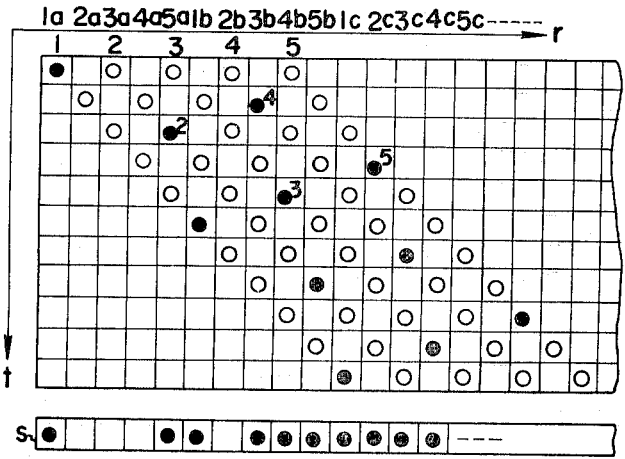
Figure 7C:
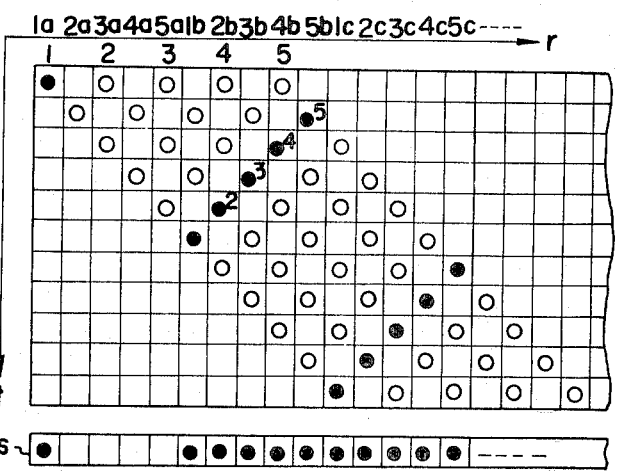

The lighting sequences of FIGS. 7B and 7C can be realized in a similar manner.

In the above described cases (I) and (II), only one light source is energized to light on at one time (θ=1). But, there may be considered other cases wherein two or more light sources are lighted up at the same time as mentioned hereinafter.

Figure 9:
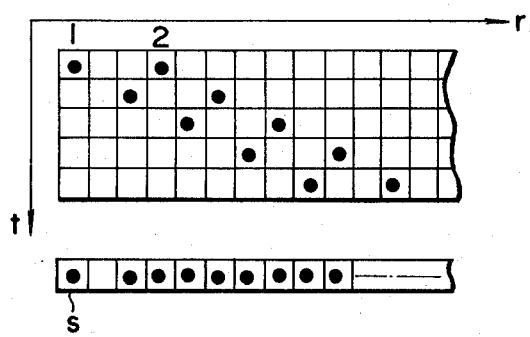
FIG. 9 shows a third example of a lighting sequence of light sources.

(III) m=2, N=3, l=2, θ=2;

This is the case wherein two light sources are energized at the same time as shown in FIG. 9 and image of each light source is shifted by two picture elements with every clock pulse.

Figure 10:
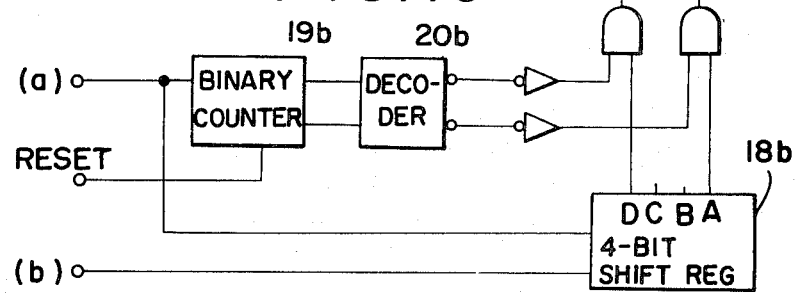
FIG. 10 is a circuit diagram adapted for the third example of lighting sequence.

Since a shift of two picture elements is done for every clock pulse and two light sources are energized at the same time, the speed of recording is doubled without any change of load on the light sources. In order to advance the image of each light source by two picture elements with every clock pulse, a circuit as shown in FIG. 10 which includes a 4-bit shift register 18b, binary counter 19 etc. may be used. The frequency of clock pulses used in the circuit is doubled so that the light image is advanced by one picture element with every one clock and the light source is energized to light up with every two clocks.

Figure 11:
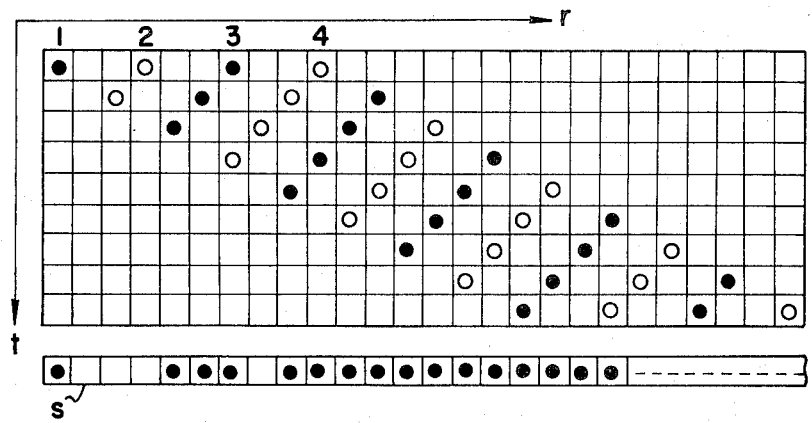
FIG. 11 shows a fourth example of lighting sequence.

(IV) m=4, N=3, l=2, θ=2;

Lighting sequence necessary for this case is illustrated in FIG. 11. The lighting sequence may be realized by a circuit including four gates and a decimal counter (not shown).

(V) Generalization with N=n and by a general formula (m, n, l, θ);

As a general case, it is considered that on a recording surface there are arranged regularly m light sources with a pitch of spacing n times larger than the size of a picture element and that the light sources are driven in such a manner that with every one clock pulse they are shifted by l picture element(s) and θ of the light sources is (or are) energized to light up at the same time for every one clock pulse.

Conditions necessary for recording all of the picture elements without any dropping and without any overlapping are:
(a) $l = \theta$ and
(b) $m/\theta$ is a natural number, $(m/\theta, i)$ are prime to each other wherein i is a natural number satisfying the condition $i \leq m/\theta$ and for this natural number i $(mn/\theta, ni+1)$ are prime to each other.

When such natural numbers $(m, n, l, \theta, i)$ satisfying the above conditions are found out, m light sources should be energized to light up in the following sequence:

1, $m/\theta+1$, $2m/\theta+1$ - - - (but, $km/\theta+1 < m$ wherein k is a natural number) light up at first and then light up $1+i$, $m/\theta+i+1$, $2m/\theta+i+1$ - - -.

The above conditions will be understood more clearly from the following description.

Assuming that the image of each light source is shifted by l picture elements with every one clock pulse and $\theta$ pieces of pel information are issued for every one clock pulse, the number of pel information issued after c pulses will become $\theta c$. During the time, the image of light source has moved a distance of lc. If $l > \theta$, then $lc > \theta c$, which means that there occurred some vacancy. Therefore, the condition $l = \theta$ is absolutely necessary.

Secondly, the condition necessary for recording all of the picture elements without any overlapping is considered.

Among m light sources there must be energized $\theta$ light source(s) to light up at the same time. Therefore, these light sources can be devided into $\theta$ groups. The number of light sources per group is $m/\theta$ which must be a natural number.

Lighting of the light sources must be made successively and without overlapping in the sequence of the first one, $i+1$ th one, $2i+1$ th one, - - - $ni+1$ - - -, until all of $m/\theta$ light sources have lighted up.

In order to satisfy the condition, i and $m/\theta$ must be prime to each other. Namely, it is only when i and $m/\theta$ are prime to each other that using $m/\theta$ as a divisor the sum of 1 and i can be distributed to $m/\theta$ without any overlapping.

Figure 12:
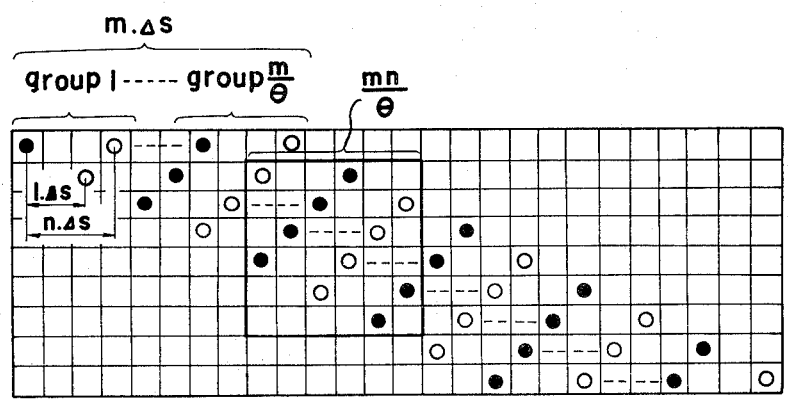
FIG. 12 shows the lighting sequence of light sources (the number of which is m) arranged with a pitch of n.

FIG. 12 shows the lighting sequence for the case wherein m light sources are regularly arranged with a pitch of n. The total length of light source corresponds to m n picture elements. Therefore, the number of picture elements covered by one single group is m $n/\theta$. It is required to avoid overlapping among all of the picture elements contained in this area. The distance moved by each light source within one group with every one clock is $ni+1$ in picture element unit. Lighting of light source is advanced in the sequence of 1, $i+1$, $2i+1$, - - - $ni+1$. If the sequence number of lighting exceeded the number of light sources contained in one group, that is, the number $m/\theta$, then it must be considered that lighting of light source went along into the next group because of the above described condition that $(m/\theta, i)$ are prime to each other.

Thus, in order to cover all the picture elements without overlapping, it is required that no overlapping exists among multiples of $ni+1$ using $mn/\theta$ as a divisor. Therefore, the condition that in the combination $(mn/\theta, ni+1)$, the two numbers $mn/\theta$ and $ni+1$ should be prime to each other, is absolutely necessary.

Like the condition of $(m/\theta, i)$, the above condition of $(mn/\theta, ni+1)$ can be demonstrated as follows:

Numerical values produced by multiples of $ni+1$ with $mn/\theta$ as a divisor are generally represented by:

$$\alpha(ni+l) = mn/\theta \cdot \beta + \gamma$$

wherein $\alpha$, $\beta$ is a whole number.

In the above equation, values which $\gamma$ may to be are:

$$\gamma = 0, 1, 2, - - - (mn/\theta - 1).$$

Here, it should be noted that $(mn/\theta - 1)$ is the possible maximum value which $\gamma$ may take.

Assume that $ni+1$ and $mn/\theta$ were not prime to each other, and let p denote a common factor. Then, $$ni + l = p \cdot \frac{ni+l}{p}$$

$$\frac{mn}{\theta} = p \cdot \frac{mn/\theta}{p}$$

$$\therefore \alpha \cdot p \cdot \frac{ni+l}{p} = p \cdot \frac{mn/\theta}{p} \cdot \beta + \gamma$$

$$\alpha \cdot \frac{ni+l}{p} = \frac{mn/\theta}{p} \cdot \beta + \tau(\tau = \frac{\gamma}{p})$$

Here, values which the residue $\Gamma$ is allowed to be are:

$$\tau = 0, 1, 2, - - - -, (\frac{mn}{\theta p} - 1)$$

Note should be taken to the fact that the possible maximum value which the residue $\Gamma$ can take is only $$(\frac{mn}{\theta p} - 1)$$

which is smaller than $mn/\theta$. Therefore, under this assumption it is impossible to cover all of $mn/\theta$. Now, it is concluded that $mn/\theta$ and $ni+1$ should be prime to each other.

Some simple examples are given below.
(i) $(m, n, l, \theta) = (5, 1, 1, 1)$;
Since $l = \theta = 1$ and $m/\theta = 5$, $i = 1, 2, 3, 4$.

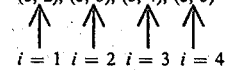

$(mn/\theta, ni+l) = (5, 2), (5, 3), (5, 4), (5, 5)$
$i = 1$  $i = 2$  $i = 3$  $i = 4$ The condition that $mn/\theta$ and $ni+1$ should be prime to each other can be satisfied only when $i = 1, 2, 3$.

Therefore, the lighting sequence becomes:
(a) when $i = 1$, 1-2-3-4-5
(b) when $i = 2$, 1-3-5-2-4
(c) when $i = 3$, 1-4-2-5-3

This corresponds to the above mentioned Case (I) wherein $m = 5$, $N = 1$, $l = 1$ and $\theta = 1$.

(ii) $(m, n, l, \theta) = (5, 2, 1, 1)$;
In this case,

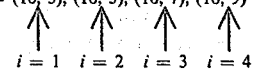

$i = 1, 2, 3, 4$
$(mn/\theta, ni+l) = (10, 3), (10, 5), (10, 7), (10, 9)$
$i = 1$  $i = 2$  $i = 3$  $i = 4$ Therefore, the necessary condition is satisfied only when $i = 1, 3, 4$.

The lighting sequence becomes:

(a) 1-2-3-4-5
(b) 1-4-2-5-3
(c) 1-5-4-3-2

This corresponds to the above mentioned Case (II) wherein m=5, N=2, l=1 and $\theta=1$.

(iii) (m, n, l, $\theta$)=(2, 3, 2, 2);
In this case, m/$\theta$=1, ∴ i=1 only, (mn/$\theta$, ni+l)=(3, 5), which are prime to each other and therefore satisfy the necessary condition.

The sequence of lighting is the simultaneous lighting of 1 and 2. This corresponds to the above mentioned Case (III) wherein m=2, N=3, l=2, $\theta=2$.

$$(m, n, l, \theta) = (4, 3, 2, 2); \quad \text{(iv)}$$
$$m/\theta = 2 \therefore i = 1 \text{ only}$$
$$(mn/\theta, ni + l) = (6, 5),$$

which are prime to each other. The lighting sequence becomes (1, 3)−(2, 4). This corresponds to the above mentioned Case (IV) wherein m=4, N=3, l=2 and $\theta=2$.

$$(m, n, l, \theta) = (10, 3, 2, 2); \quad \text{(v)}$$
$$m/\theta = 5 \therefore i = 1, 2, 3, 4.$$
$$(mn/\theta, ni + l) = (15, 5), (15, 8), (15, 11), (15, 14)$$
$$\quad\quad\quad\quad\quad\quad\quad i=1 \quad i=2 \quad i=3 \quad i=4$$

The necessary condition is satisified only when i=2, 3, 4.

Figure 13C:
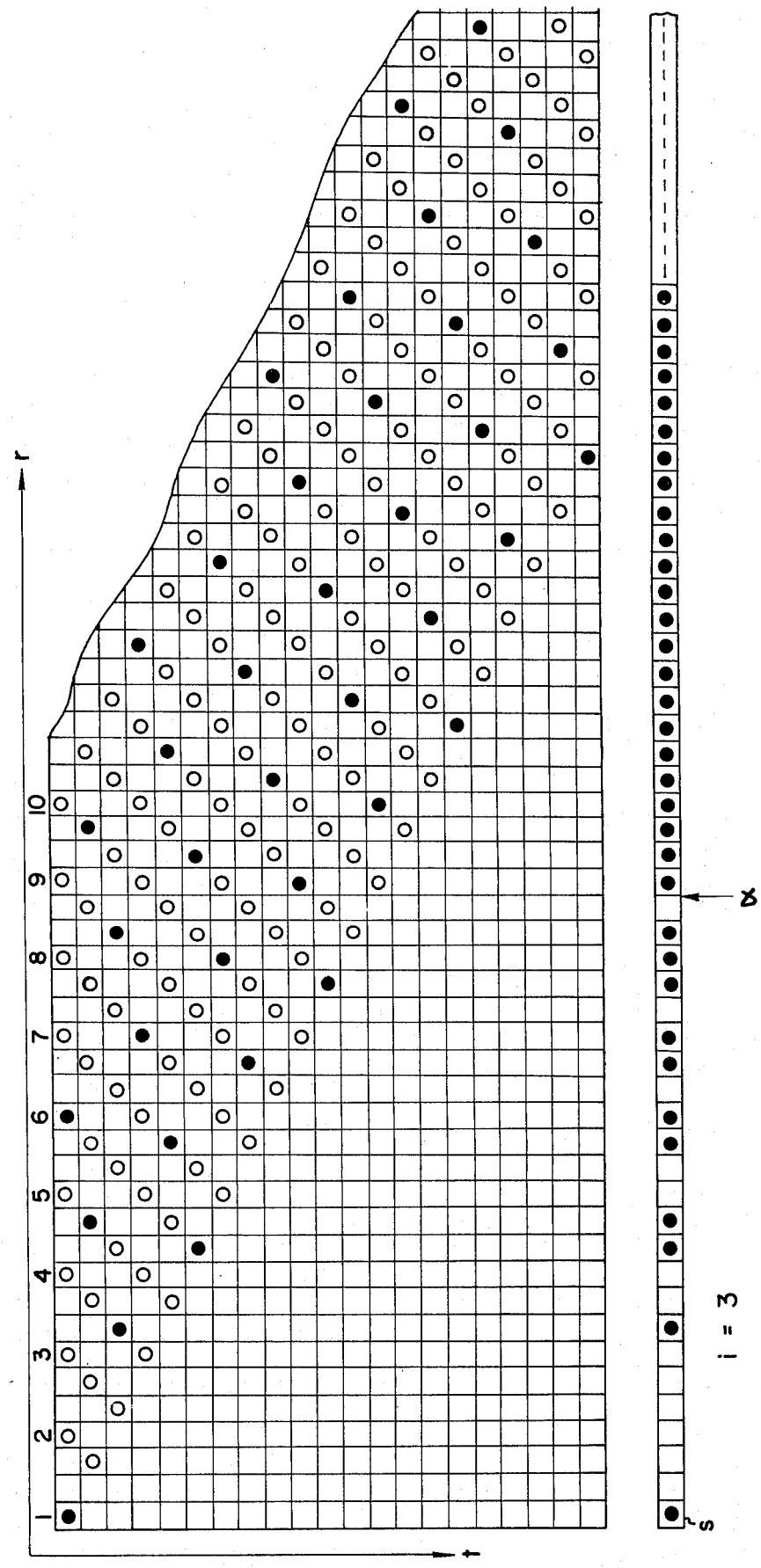

FIGS. 13A through D illustrate this example in which (m, n, l, $\theta$)=(10, 3, 2, 2), FIG. 13A being for i=1, FIG. 13B for i=2, FIG. 13C for i=3 and FIG. 13D for i=4.

From these Figures it is seen that when i=1 there occur evidently some overlaps (see mark ⊙ in FIG. 13A) and that there is no overlap when i=2, 3, 4. In FIGS. 13B–13D, the portions extending rightward from α can be used for scanning, respectively.

The lighting sequence becomes:
 (a) when i=1, (1, 6)-(2, 7)-(3, 8)-(4, 9)-(5, 10)
 (b) when i=2, (1, 6)-(3, 8)-(5, 10)-(2, 7)-(4, 9)
 (c) when i=3, (1, 6)-(4, 9)-(2, 7)-5, 10)-(3, 8)
 (d) when i=4, (1, 6)-(5, 10)-(4, 9)-(3, 8)-(2, 7).

The information output unit according to the invention are applicable not only to scanning in a principal scanning direction (constant direction) but also to scanning in a secondary direction (in the direction across the principal direction). Therefore, a further speed-up is attainable by doing so.

Figure 14:
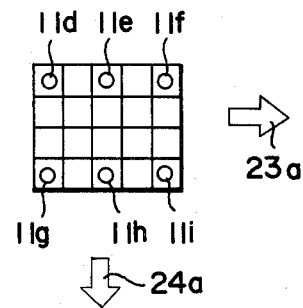
FIG. 14 is a front view of light sources arranged two-dimensionally.

For example, as shown in FIG. 14, light sources 11d–11i may be arranged two-dimensionally. Arrow 23a indicates the principal scanning direction and arrow 24a indicates the secondary scanning direction. When the light sources are lightened up one by one or two or more at the same time in the principal direction and all of the light sources are together driven in the secondary scanning direction in timing with the lighting of light sources in the principal direction, then scanning speed may be increase to an extent corresponding to the number of light sources. As to the example of FIG. 11, when (m, n, l, $\theta$)=(3, 2, 1, 1) and i=2, only (mn/$\theta$, ni+l)=(3, 5) becomes effective in the principal scanning direction and the light sources become light in the sequence of 1, 3, 2 - - -. In the secondary scanning direction, when (m, n, l, $\theta$)=(2, 3, 2, 2) and i=1, (mn/$\theta$, ni+l)=(3, 4) - - - become prime to each other. Therefore, recording may be carried out in such manner that information shifted by three lines in the secondary direction is recorded by principal scanning at first, the light sources are advanced by two lines in the secondary direction after recording one line and then again scanning is carried out in the principal direction. By employing this mode of recording, it is allowed to use and arrange such light sources the size of which is larger than the pitch of picture element.

Moreover, the information output unit according to the invention is applicable to all types of apparatus in which recording is effected with scanning. Thus, for a recording method using light, information recording means may be formed by combining plurality of light sources driven independently of each other. For a thermal recording method, a combination of thermal head and heating wire may be used as information recording means according to the invention. For a recording method using electric current, a combination of stylus electrode and electric current path may be used as information recording means. Also, for a recording method using a spray of liquid droplets, the inject head and droplets may be combined to form information recording means according to the invention.

While scanning these information means with suitable shifting means which may be deflection of light, mechanical feeding etc., picture elements can be recorded on a recording medium according to the invention previously described in detail.

Figure 15:
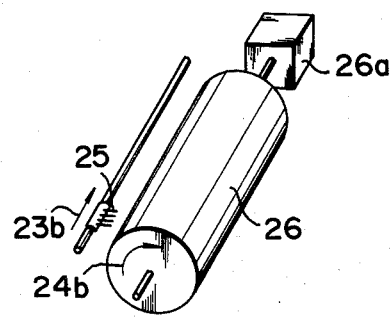
FIG. 15 is a perspective view of a scanning part employing a stylus electrode.

FIG. 15 illustrates one example of application form of the invention. Designated by 25 is a stylus electrode which is driven in the principal scanning direction indicated by arrow 23b at a uniform speed using a suitable driving means such as linear motor. During the stylus electrodes 25 being driven in the principal scanning direction, a rotary recording drum 26 is rotated by a motor 26 in the secondary scanning direction of arrow 24a nearly perpendicular to the principal scanning direction so as to effect recording. Regular arrangement of semiconductor laser, L E D or other light sources in rows may be done very easily employing conventional techniques.

Assuming that when one single light source is used, it takes T seconds for recording, the time necessary for recording will be reduced to T/m seconds by arranging m light sources driven independently of each other with a constant spacing in the scanning direction according to the invention. This remarkable speed-up is attainable without adding load on the light sources, that is, without changing the above mentioned duty of operation.

One particular advantage of the information output unit according to the invention is found in that it is also applicable to such case where the distance between the neighbouring light source images on the recording surface is relatively large as compared with the pitch of picture elements. Owing to this advantage, the arrangement of plurality of light sources (or electrodes) becomes easy and accuracy can be improved. Furthermore, it has an advantageous effect on dissipation of heat generated from the used light sources, crosstalk of electric charge or the like.

While the invention has been particularly shown and described with reference to preferred embodiments thereof, it will be understood by those skilled in the art that the foregoing and other changes in form and details can be made therein without departing from the spirit and scope of the invention.

We claim:

1. An information output unit comprising:

m information recording means for recording information on a recording medium, said means being disposed in parallel with each other such that their recording positions are spaced from each other by a distance, between centers, of n elements in a predetermined direction;

shifting means for shifting the relative position between said recording positions of said information recording means and said recording medium at least in the predetermined direction by a distance of l elements during a predetermined time, said l being smaller than the number m of information recording means; and information output means for rearranging the series sequence of input signals applied thereto and for applying said rearranged signals to $\theta$ of said information recording means at substantially the same time;

wherein $m/\theta$ is a natural number, $i \leq m/\theta$ where i is a natural number to which $m/\theta$ is prime and $mn/\theta$ and $ni+1$ are prime to each other.

2. An information output unit as claimed in claim 1, wherein $n \geq 2$.

3. An information output unit as claimed in claim 1, wherein each of said information recording means includes a beam of light and said shifting means is a deflector for deflecting said beam of light.

4. An information output unit as claimed in claim 2, wherein each of said information recording means includes a beam of light and said shifting means is a deflector for deflecting said beam of light.

5. An information output unit comprising:

m information recording means for recording information on a recording medium, said means being disposed in parallel with each other such that their recording positions are spaced from each other by a distance, between centers, of n elements in a predetermined direction;

shifting means for shifting the relative position between said recording positions of said information recording means and said recording medium at least in the predetermined direction by a distance of l elements during a predetermined time; and information output means for rearrangined the series sequence of input signals applied thereto and for applying said rearranged signals to $\theta$ of said information recording means at substantially the same time, said $\theta$ being smaller than the number m of said information recording means;

wherein $m/\theta$ is a natural number, $i \leq m/= \theta$ where i is a natural number to which $m/\theta$ is prime and $mn/\theta$ and $ni+1$ are prime to each other.

6. An information output unit as claimed in claim 5, wherein $n \geq 2$.

7. An information output unit as claimed in claim 5, wherein each of said information recording means includes beam of light and said shifting means is a deflector for deflecting said beam of light.

8. An information output unit as claimed in claim 5, wherein said amount of shift during a predetermined time is l elements, l being smaller than the number m of said information recording means.

9. An information output unit as claimed in claim 6, wherein said amount of shift during a certain given time is l elements, l being smaller than the number m of said information recording means.

10. An information output unit as claimed in claim 6, wherein each of said information recording means includes a beam of light and said shifting means is a deflector for deflecting said beam of light.

11. An information output unit as claimed in claim 8, wherein each of said information recording means includes a beam of light and said shifting means is a deflector for deflecting said beam of light.

12. An information output unit as claimed in claim 9, wherein each of said information recording means includes a beam of light and said shifting means is a deflector for deflecting said beam of light.

13. An information output unit comprising:

a plurality of information recording means disposed in parallel in a predetermined direction for recording information on a recording medium;

shifting means for shifting the relative position between the recording positions of said information recording means and said recording medium at least in the predetermined direction;

gate circuit means for transmitting said information at substantially the same time to a number of said information recording means less than the total number thereof; and rearranging means for rearranging the series sequences of signals introduced thereinto and for applying said rearranged signals to said gate circuit means.

14. An information output unit as claimed in claim 13, wherein said rearranging means is a shift register.

15. An information output unit as claimed in claim 13, wherein each of said information recording means comprises a beam of light and said shifting means is a deflector for deflecting said beam of light.

16. An information output unit as claimed in claim 14, wherein each of said information recording means comprises a beam of light and said shifting means is a deflector for deflecting said beam of light.

17. An information output unit comprising:

a plurality of information recording means disposed in parallel in a predetermined direction for recording information on a recording medium;

shifting means for shifting the relative position between the recording positions of said information recording means and said recording medium at least in the predetermined direction; and information output means for rearranging the series sequence of input signals applied thereto and for applying said rearranged signals at substantially the same time to a number of said information recording means less than the total number thereof.

18. An information output unit as claimed in claim 17, wherein the direction in which said recording positions of said information recording means are moved on said recording medium is the same as the direction in which said information is applied successively to said plurality of information recording means.

19. An information output unit as claimed in claim 17, wherein the direction in which said recording positions of said information recording means are moved on said recording medium is opposite to the direction in which said information is applied successively to said plurality of information recording means.

20. An information output unit as claimed in claim 17, wherein each of said information recording means includes a beam of light and said shifting means is a deflector for deflecting said beam of light.

* * * * *

UNITED STATES PATENT OFFICE
CERTIFICATE OF CORRECTION

Patent No. 4,229,750  Dated October 21, 1980

Inventor(s) NAOTO KAWAMURA, ET AL.

It is certified that error appears in the above-identified patent and that said Letters Patent are hereby corrected as shown below:

Column 1, line 13, "is" should read --in--;

Column 1, line 50, "tranmitting" should read --transmitting--;

Column 1, line 51, "Theefore" should read --Therefore--;

Column 1, line 52, "enables out the carrying" should read --enables the carrying out--;

Column 3, line 67, "manification" should read --magnification--;

Column 7, line 34, "devided" should read --divided--;

Column 8, line 9, "may to" should read --may--;

Column 9, line 60, "increase" should read --increased--;

UNITED STATES PATENT OFFICE
CERTIFICATE OF CORRECTION

Patent No. 4,229,750    Dated  October 21, 1980

Inventor(s) NAOTO KAWAMURA, ET AL.

It is certified that error appears in the above-identified patent and that said Letters Patent are hereby corrected as shown below:

Column 10, line 13, after "combining" insert --a--;

Column 10, line 40, "laser" should read --lasers--;

Column 11, line 46, Claim 5, "rearrangind" should read --rearranging--.

Signed and Sealed this

Seventeenth Day of March 1981

[SEAL]

Attest:

Attesting Officer

RENE D. TEGTMEYER

Acting Commissioner of Patents and Trademarks